US008000337B2

(12) United States Patent
Saha

(10) Patent No.: US 8,000,337 B2
(45) Date of Patent: Aug. 16, 2011

(54) RUNTIME FLOW DEBUGGING A NETWORK DEVICE BY EXAMINING PACKET COUNTERS AT INTERNAL POINTS

(75) Inventor: Arun Saha, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 167 days.

(21) Appl. No.: 12/413,507

(22) Filed: Mar. 27, 2009

(65) Prior Publication Data

US 2010/0246407 A1 Sep. 30, 2010

(51) Int. Cl.
*H04L 12/26* (2006.01)
*H04J 1/16* (2006.01)
*G08C 15/00* (2006.01)
*G06F 11/00* (2006.01)
*G01R 31/06* (2006.01)

(52) U.S. Cl. ......... 370/419; 370/242; 370/362; 714/729
(58) Field of Classification Search .......... 370/241–252, 370/362–419; 711/141–147; 714/37–45, 714/726–734
See application file for complete search history.

(56) References Cited

U.S. PATENT DOCUMENTS

| 5,878,051 | A | * | 3/1999 | Sharma et al. | 714/724 |
|---|---|---|---|---|---|
| 6,718,294 | B1 | * | 4/2004 | Bortfeld | 703/20 |
| 6,754,863 | B1 | * | 6/2004 | Grannis, III | 714/729 |
| 6,760,876 | B1 | * | 7/2004 | Grannis, III | 714/729 |
| 6,813,739 | B1 | * | 11/2004 | Grannis, III | 714/729 |
| 2006/0179374 | A1 | * | 8/2006 | Noble | 714/727 |
| 2009/0063780 | A1 | * | 3/2009 | Terechko et al. | 711/141 |
| 2009/0282294 | A1 | * | 11/2009 | Edwards | 714/45 |
| 2010/0199077 | A1 | * | 8/2010 | Case et al. | 713/1 |

OTHER PUBLICATIONS

Configuring NetFlow Statistics Collection, Cisco Systems, downloaded Mar. 2009 available on the Web at http://www.cisco.com/en/US/docs/switches/lan/catalyst4500/12.2/25ew/configuration/guide/nfswitch.pdf.
Boundary Scan, JTAG, IEEE 1149.1 Tutorial, Downloaded Mar. 2009 available on the Web at http://www.radio-electronics.com/info/t_and_m/boundaryscan/jtag-ieee-1149-basics-tutorial.php.

* cited by examiner

*Primary Examiner* — Man Phan
(74) *Attorney, Agent, or Firm* — Charles E. Krueger

(57) ABSTRACT

In one embodiment, the internal path traversed by packets between two user visible interface, selected by a user, is displayed. The path displayed includes internal interfaces traversed by the packets. First and second count values showing the packets traversing each displayed internal interface at the beginning and end of a selected time period are also displayed. A delta, being the difference between the first and second count values for each internal interface indicates the number of packets traversing the interface during the time period and can be analyzed to determine the identity of a packet processing hardware logic block where packets might be getting dropped.

19 Claims, 8 Drawing Sheets

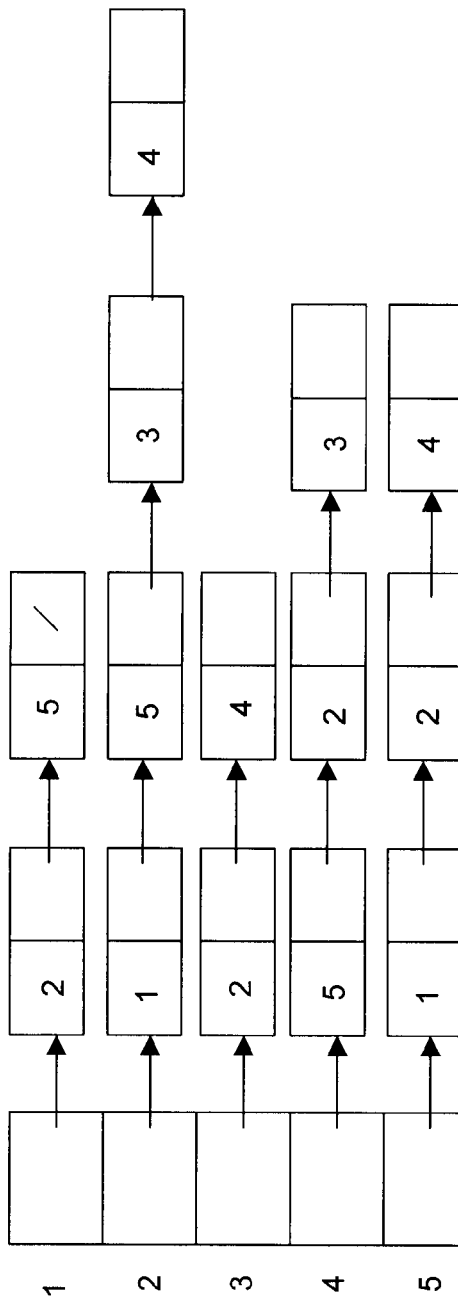
FIG. 5B
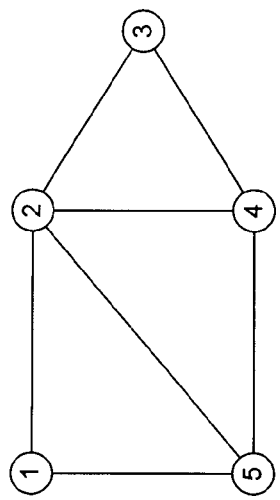
FIG. 5A
Compact notation:
| 1 | 2, | 5 |  |
|---|----|---|---|
| 2 | 1, | 3, | 4, 5 |
| 3 | 2, | 4 |  |
| 4 | 2, | 3, | 5 |
| 5 | 1  | 2, | 4 |
FIG. 5C

TRACEINTERNAL — GRAPH — DETAIL LEVEL -- 0

| | | | |
|---|---|---|---|
| 0. A | 0. B | 0. C | 0. D |
| 0. B | 0. A | 0. C | 0. D |
| 0. C | 0. A | 0. B | 0. D |
| 0. D | 0. A | 0. B | 0. C |

FIG. 6A

TRACEINTERNAL — GRAPH — DETAIL LEVEL -- 1

| | |
|---|---|
| 0. A | 1. p1 |
| 0. B | 2. p2 |
| 0. C | 3. p2 |
| 0. D | 1. p4 |
| 1. p1 | 0. A, 1. p2, 1. p3, 1. p4 |
| 1. p2 | 1. p1, 1. p3, 1. p4, 2. p1 |
| 1. p3 | 1. p1, 1. p2, 1. p4, 3. p1 |
| 1. p4 | 0. D, 1. p1, 1. p2, 1. p3 |
| 2. p1 | 1. p2, 2. p2 |
| 2. p2 | 0. B, 2. p1 |
| 3. p1 | 1. p3, 3. p2 |
| 3. p2 | 0. C, 3. p1 |

FIG. 6B

RUNTIME FLOW DEBUGGING A NETWORK DEVICE BY EXAMINING PACKET COUNTERS AT INTERNAL POINTS

TECHNICAL FIELD

The present disclosure relates generally to debugging a network device that is dropping packets and more particularly to understanding, examining, and troubleshooting a network device by systematically and recursively extracting information about the packet processing logic blocks that constitute the device.

BACKGROUND OF THE INVENTION

Routers and switches (network devices) forward packets from an ingress interface to an egress interface. Inside the network device a packet passes through several packet forwarding hardware blocks such as, for example, a packet processing engine, a forwarding engine etc. where each block has input/output interfaces and the blocks are connected via their interfaces. Generally different network devices include different sets packet processing hardware blocks. The operating system of a particular network device includes tools accessible by the command line interface (CLI) to access counters that keep track of the number of packets received and transmitted at each interface of the packet processing hardware blocks.

If it is discovered that the some ingress packets does not egress at the expected interface, then it may be necessary to perform a debugging procedure on the network device. The result of the debugging procedure typically is to identify the exact point or exact block, in as much detail as possible, where the packets might be getting dropped.

A technician having detailed knowledge of the internal architecture and operation of the network device, the internal hardware logic blocks, the connections among internal interfaces, and path expected to be taken by a given packet may use one or more of the hidden CLI to investigate where the packets might be getting dropped. However, in general, users do not have such detailed familiarity and accessibility of the devices being used at their facility, and such debugging based on intimate knowledge of the device inner working is not possible.

BRIEF DESCRIPTION OF THE DRAWINGS

FIGS. 5A-C illustrate adjacency-list graph representations;

FIGS. 6A-B illustrate adjacency-list graph representations of the detail-levels.

DESCRIPTION OF EXAMPLE EMBODIMENTS

Overview

Figure 1:
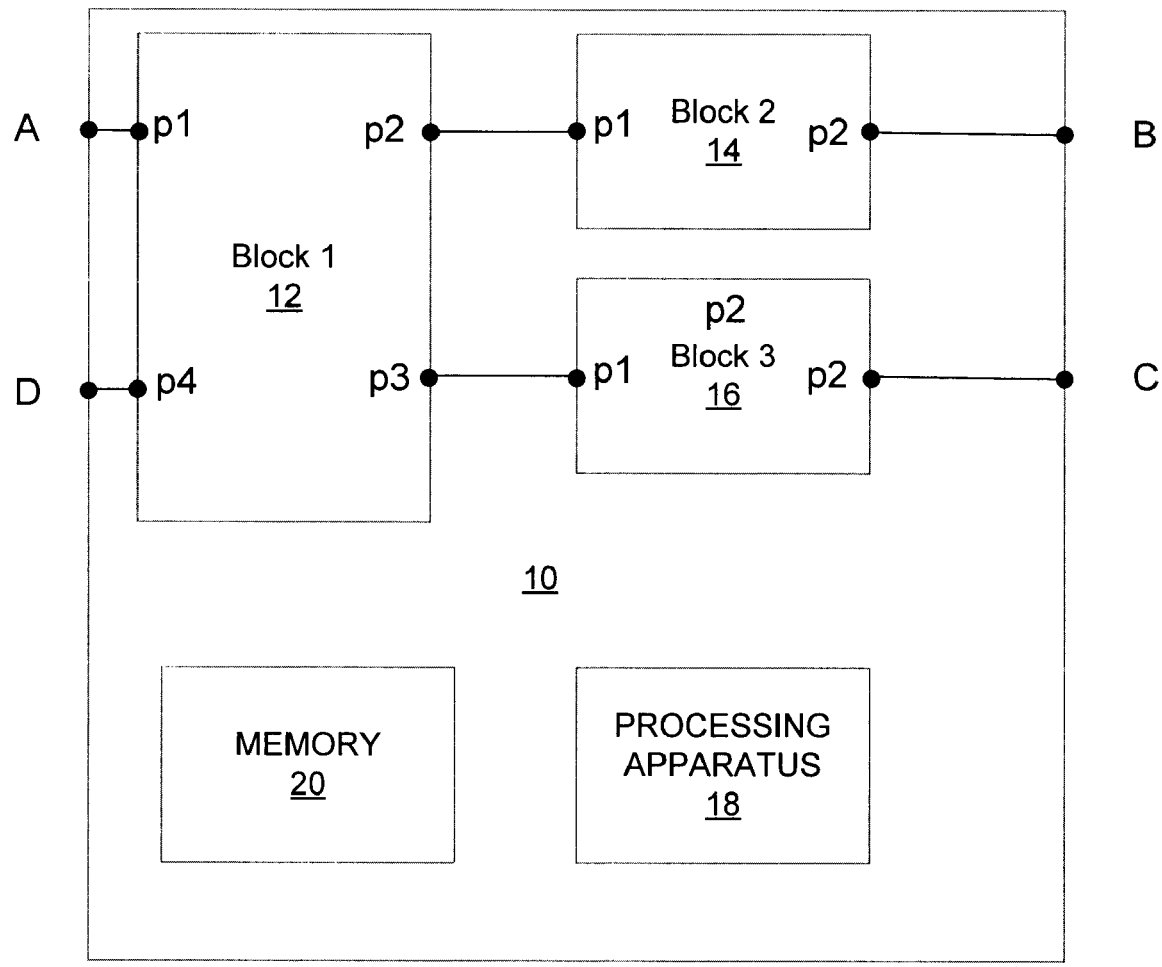
FIG. 1 illustrates an example of a network device.

In an example embodiment, an apparatus comprises a plurality of packet processing hardware logic blocks included in a network device, with each packet processing hardware logic block including internal interfaces coupled to internal interfaces of another hardware logic block or to a user visible interface of the network device, with the network device configured so that packets ingressing at a first user visible interface and egressing from a second user visible interface always traverse a particular path of internal user interfaces and packet processing hardware logic blocks, a memory storing a plurality of count values, each count value indicating a total number of packets that have traversed an associated internal interface, storing path data indicating the internal interfaces and packet processing hardware logic blocks traversed by packets ingressing at a user-selected first user visible interface and egressing from a user-selected second user visible interface of the network device and storing computer executable program code, and a processing apparatus, coupled to the memory, configured to execute program code to receive identities of user-selected first and second user visible interface, to access first stored path data identifying the particular internal interfaces and packet processing hardware logic blocks that form a first path traversed by packets ingressing at the user-selected first user visible interface and egressing from the user-selected second user visible interface, to access a first set of count values associated with internal interfaces of the packet processing hardware logic blocks included in the first path, to wait a selected time interval, to access a second set of count values associated with the user visible interfaces in the first data when the time interval expires, and to display the count values in the first and second sets for each internal interface of the packet processing hardware logic blocks included in the first path.

DESCRIPTION

Reference will now be made in detail to various embodiments of the invention. Examples of these embodiments are illustrated in the accompanying drawings. While the invention will be described in conjunction with these embodiments, it will be understood that it is not intended to limit the invention to any embodiment. On the contrary, it is intended to cover alternatives, modifications, and equivalents as may be included within the spirit and scope of the invention as defined by the appended claims. In the following description, numerous specific details are set forth in order to provide a thorough understanding of the various embodiments. However, the present invention may be practiced without some or all of these specific details. In other instances, well known process operations have not been described in detail in order not to unnecessarily obscure the present invention. Further, each appearance of the phrase an "example embodiment" at various places in the specification does not necessarily refer to the same example embodiment.

In the following example embodiments will be described that allow identification of an internal packet processing hardware logic block that is dropping packets. The example embodiment require no extra hardware in addition to the normal packet processing hardware. There is no requirement for special-purpose hardware for packet matching and/or counting. Further, the example techniques described are non-intrusive and do not affect the normal operation of a network device.

The example embodiments have multiple uses such as, for example, debugging a field-deployed network device, debugging a network device during development and/or sanity testing of a network device. Further uses include demonstrating a particular feature of a network device, learning the packet flow path between selected interfaces of a network device and/or teaching users about the internal structure of a device, possibly with packet flow details.

FIG. 1 depicts an example network device 10 including user visible interfaces A-D, first, second and third packet processing hardware logic blocks 12, 14 and 16, a processing apparatus 18 and a memory 20 holding data and computer executable instructions. The internal interfaces of the packet processing hardware logic blocks, such as p1, p2, p3, p4 in Block 1, p1, p2 in Block 2, and p1, p2 in Block 3 are shown in FIG. 1. Each user visible interface is connected to at least one internal interface.

In the example network device 10 the path between two user visible interfaces is not variable. Accordingly, a packet that is received at user visible A and transmitted from user visible interface C will always follow the same path through the internal packet processing hardware logic blocks 12-16.

Inside the user visible interfaces, users can create multiple Ethernet Virtual Connections (EVCs) pre User Network Interface (UNI) (see Metro Ethernet Forum Technical Specification MEF 6.1 Ethernet Service Definitions—Phase 2, April 2008, available on the metroethernetforum web site with the extension .org/PDF_Documents/MEF6-1.pdf). The network device can forward packets between interfaces or between flow points. In other words, (src point, dest point) can be either of src interface, dest interface) or (src EVC per UNI, dest EVC per UNI). The following discussion applies to both models.

An example embodiment of a technique for determining which internal packet processing hardware logic block might be dropping packets will now be described. In this example embodiment the traceinternal tool is part of the software running on a network device. However, the knowledge required for it to work may be provided only at runtime (as described more fully below).

For a selected network device, e.g., the network device 10 depicted in FIG. 1, the internal path between each of the user visible interfaces is computed based on the adjacency-list based graph representation supplied via an auxiliary file. As described below, this information is made visible to a user using a the CLI set part of traceinternal tool command and also provides information that can be utilized to identify a packet processing hardware logic block that is dropping packets.

As is known in the art, a network device keep large numbers of counters to indicate that certain events have occurred at each internal interface. Examples might include packets forwarded, bytes forwarded, overrate bytes, underrate bytes, etc. One frequent choice for packet processing applications is to use 64-bit externally-visible counters that are large enough to ensure that they will never wrap. These counters are typically stored in system RAM (usually DRAM or SDRAM). A corresponding counter is typically implemented in hardware and is usually much smaller than sixty-four bits. In order to provide the external view of a large counter, the system software periodically reads each counter from the hardware device, and adds the value that is already stored in the system RAM. In an example embodiment the visible counter values are stored in system memory 20 and are accessible by software executed by the processing apparatus 18.

In this example embodiment the following format is used for inputs specified by the user: 1)<source> and <destination> specify user visible interfaces, 2)<detail-level> specifies a number indicating how much detail is required, the higher the number the more detailed is the output, and 3)<interval> specifies a time interval in implementation-chosen units of time. If <detail-lev1> omitted the "detail-level 0", i.e., minimum detail, is assumed.

A path command having the syntax "#traceinternal <source> <destination> path [detail-level <detail-level>]" provides an output indicating the internal path between the specified user visible interfaces. A counters command having the syntax "#traceinternal <source> <destination> counters [detail-level <detail-level>]" provides an output indicating the internal path between the specified user interfaces and count values associated with each interface output. A counters at interval command having the syntax "#traceinternal <source> <destination> counters interval <interval> [detail-level <detail-level>]" provides an output indicating the internal path between the specified user interfaces, count values associated with each interface output before and after the expiration of the interval and a delta showing the difference between the displayed count values.

Figure 2:
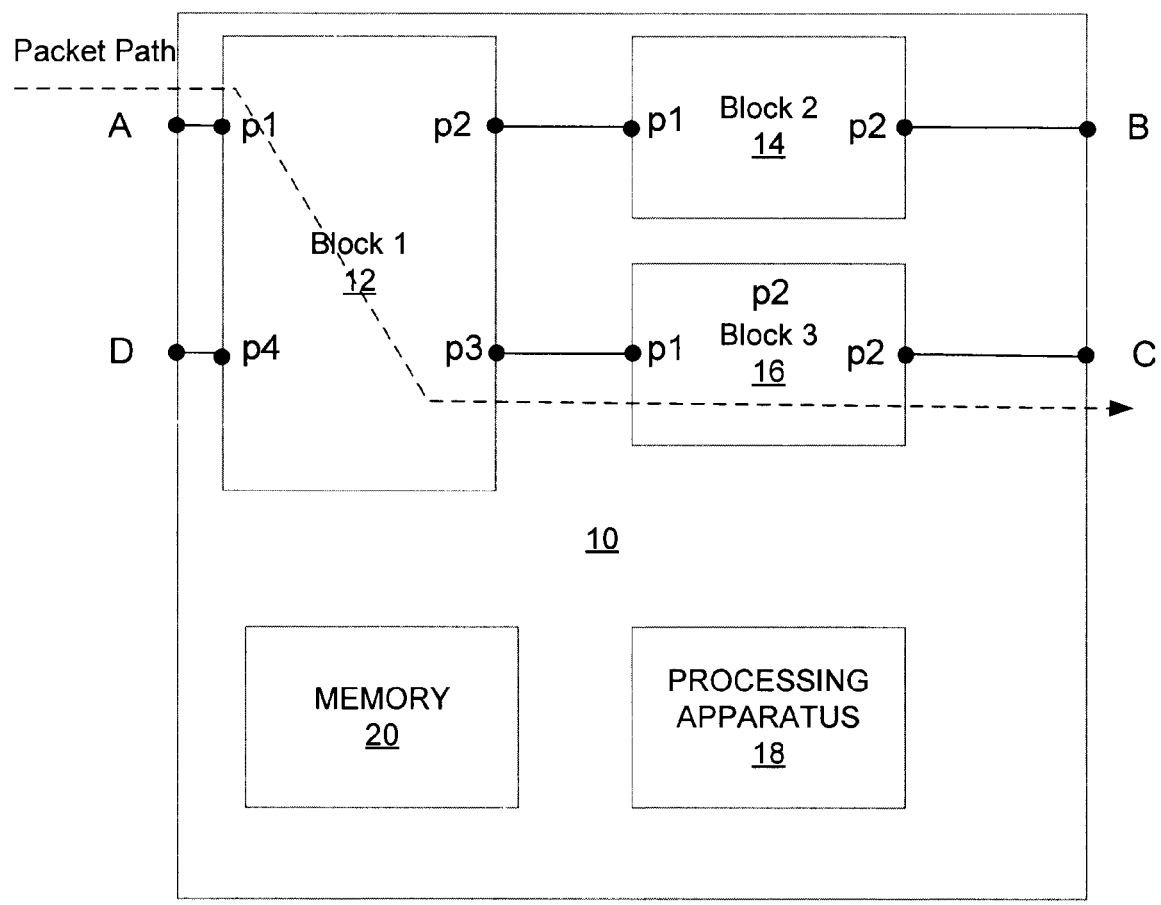
FIG. 2 illustrates an example of a path traversed by packets through the network device.
Figure 3A:
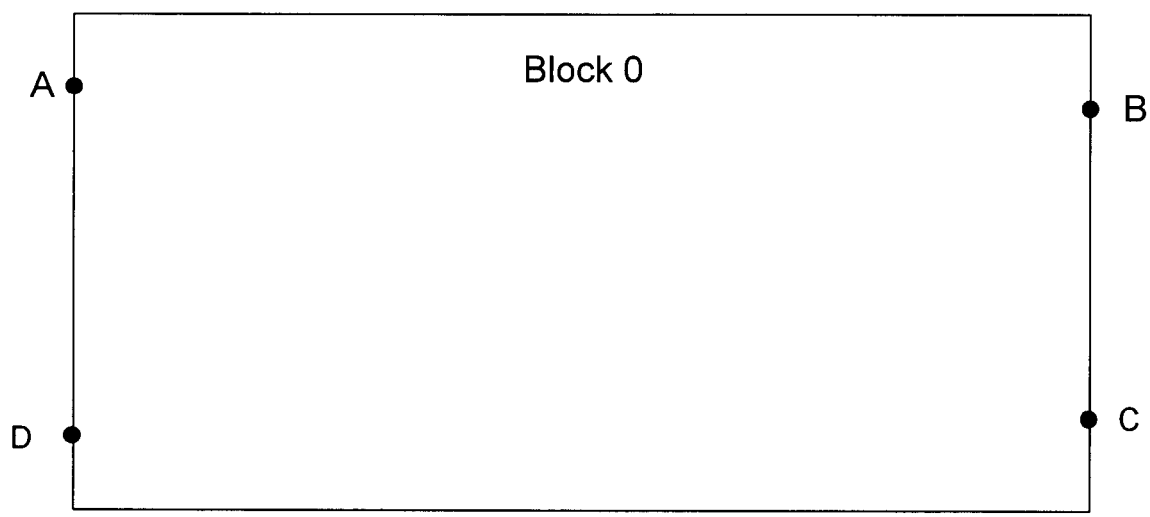
FIGS. 3A-C illustrate examples of different levels of detail presented by different commands.
Figure 3B:
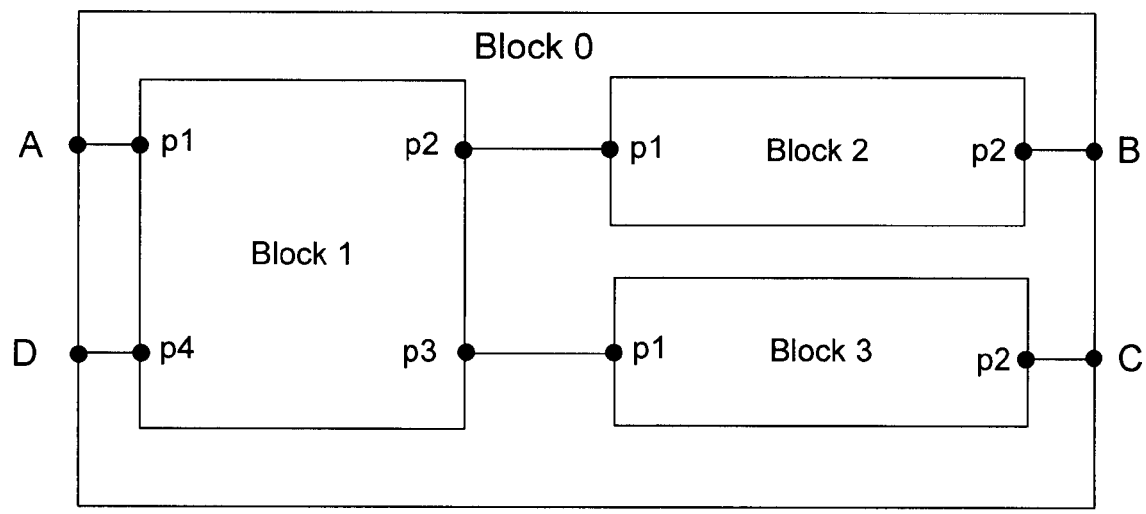

FIG. 2 depicts the internal path between user visible interfaces A and C in the example network device. FIGS. 3A-3B illustrate the internal interfaces made visible at the various levels of detail requested by the user.

Referring first to FIG. 3A, the level of detail of the path between A and C detail-level 0 is depicted.

The output for the path command having the parameters: #traceinternal <A> <C> path [detail-level <0>] is:

traceinternal A C path in block0.A
out block0.C traceinternal A C path detail-level 0 in block0.A
out block0.C

The output for the counters command having the parameters: #traceinternal <A> <C> counters [detail-level <0>] is:

traceinternal A C counters detail-level 0

| Interface | Count |
|---|---|
| in block0.A | 1000 |
| out block0.C | 4000 |

The output for the counters at interval command having the parameters: #traceinternal <A> <C> path counters interval <10>[detail-level <0>] is:

traceinternal A C counters interval 10 detail-level 0

| Interface | Count0 | Count1 (after 10) | Delta (Count1 − Count0) |
|---|---|---|---|
| in block0.A | 1000 | 1400 | 400 |
| out block0.C | 4000 | 4400 | 400 |

Referring next to FIG. 3B, the level of detail of the path between A and C detail-level 1 is depicted.

The output for the path command having the parameters: #traceinternal <A> <C> path [detail-level <1>] is:
traceinternal A C path detail-level 1

```
in block0.A
    in block1.p1
    out block1.p3
    in block3.p1
    out block3.p2
out block0.C
```

The output for the counters command having the parameters: #traceinternal <A> <C> counters [detail-level <1>] is:
traceinternal A C counters detail-level 1

| Interface | Count |
|---|---|
| in block0.A | 1000 |
| in block1.p1 | 1000 |
| out block1.p3 | 4000 |
| in block3.p1 | 4000 |
| out block3.p2 | 4000 |
| out block0.C | 4000 |

The output for the counters at interval command having the parameters: #traceinternal <A> <C> counters interval <10> [detail-level <1>] is:
traceinternal A C counters interval 10 detail-level 1

| Interface | Count0 | Count1 (after 10) | Delta (Count1 − Count0) |
|---|---|---|---|
| in block0.A | 1000 | 1400 | 400 |
| in block1.p1 | 1000 | 1400 | 400 |
| out block1.p3 | 4000 | 4400 | 400 |
| in block3.p1 | 4000 | 4400 | 400 |
| out block3.p2 | 4000 | 4400 | 400 |
| out block0.C | 4000 | 4400 | 400 |

Figure 3C:
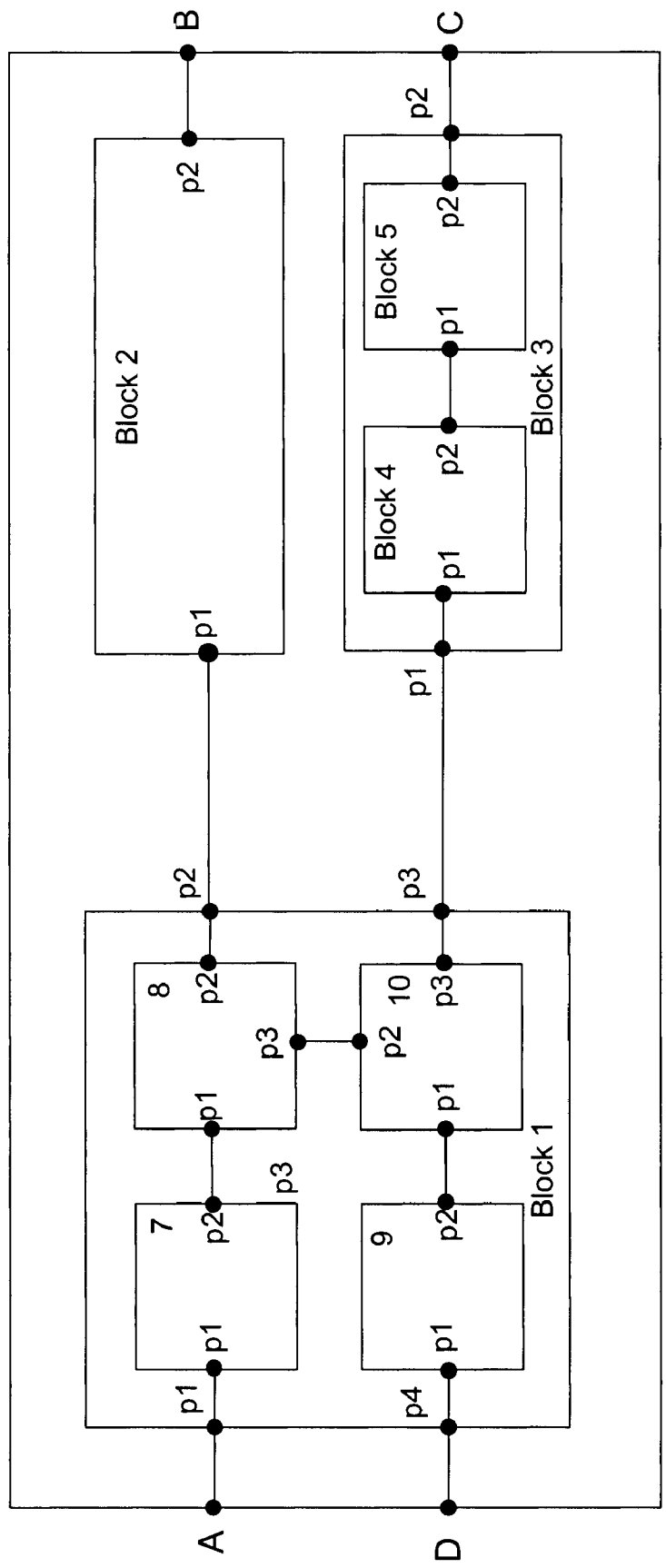

Referring next to FIG. 3C, the level of detail of the path between A and C detail-level 2 is depicted.

The output for the path command having the parameters: #traceinternal <A> <C> path [detail-level <2>] is:
traceinternal A C path detail-level 2

```
in block0.A
    in block1.p1
        in block7.p1
        out block7.p2
        in block8.p1
        out block8.p3
        in block10.p2
        out block10.p3
    out block1.p3
    in block3.p1
        in block4.p1
        out block4.p2
        in block5.p1
        out block5.p2
    out block3.p2
out block0.C
```

The output for the counters command having the parameters: #traceinternal <A> <C> counters [detail-level <2>] is:
traceinternal A C counters interval 10 detail-level 2

| Interface | Count |
|---|---|
| in block0.A | 1000 |
| in block1.p1 | 1000 |
| in block7.p1 | 1000 |
| out block7.p2 | 1000 |
| in block8.p1 | 1000 |
| out block8.p3 | 3000 |
| in block10.p2 | 3000 |
| out block10.p3 | 4000 |
| out block1.p3 | 4000 |
| in block3.p1 | 4000 |
| in block4.p1 | 4000 |
| out block4.p2 | 4000 |
| in block5.p1 | 4000 |
| out block5.p2 | 4000 |
| out block3.p2 | 4000 |
| out block0.C | 4000 |

The output for the counters at interval command having the parameters: #traceinternal <A> <C> counters interval <10> [detail-level <2>] is:
traceinternal A C counters interval 10 detail-level 2

| Interface | Count0 | Count1 (after 10) | Delta (Count1 − Count0) |
|---|---|---|---|
| in block0.A | 1000 | 1400 | 400 |
| in block1.p1 | 1000 | 1400 | 400 |
| in block7.p1 | 1000 | 1400 | 400 |
| out block7.p2 | 1000 | 1400 | 400 |
| in block8.p1 | 1000 | 1400 | 400 |
| out block8.p3 | 3000 | 3400 | 400 |
| in block10.p2 | 3000 | 3400 | 400 |
| out block10.p3 | 4000 | 4400 | 400 |
| out block1.p3 | 4000 | 4400 | 400 |
| in block3.p1 | 4000 | 4400 | 400 |
| in block4.p1 | 4000 | 4400 | 400 |
| out block4.p2 | 4000 | 4400 | 400 |
| in block5.p1 | 4000 | 4400 | 400 |
| out block5.p2 | 4000 | 4400 | 400 |
| out block3.p2 | 4000 | 4400 | 400 |
| out block0.C | 4000 | 4400 | 400 |

If there is a single flow following the path from A to C then the output of the path counters at interval command can indicate that packets are being dropped at one of the blocks. For example, if there are no malfunctioning blocks the following output would be received:
traceinternal A C counters interval 10 detail-level 2

| Interface | Count0 (after 10) | Count1 | Delta (Count1 − Count0) |
|---|---|---|---|
| in block0.A | 1000 | 1400 | 400 |
| in block1.p1 | 1000 | 1400 | 400 |
| in block7.p1 | 1000 | 1400 | 400 |
| out block7.p2 | 1000 | 1400 | 400 |
| in block8.p1 | 1000 | 1400 | 400 |
| out block8.p3 | 3000 | 3400 | 400 |
| in block10.p2 | 3000 | 3400 | 400 |
| out block10.p3 | 4000 | 4400 | 400 |
| out block1.p3 | 4000 | 4400 | 400 |
| in block3.p1 | 4000 | 4400 | 400 |
| in block4.p1 | 4000 | 4400 | 400 |
| out block4.p2 | 4000 | 4400 | 400 |
| in block5.p1 | 4000 | 4400 | 400 |
| out block5.p2 | 4000 | 4400 | 400 |
| out block3.p2 | 4000 | 4400 | 400 |
| out block0.C | 4000 | 4400 | 400 |

However, if there is an error condition at Block 5 then the following output would be received:

traceinternal A C counters interval 10 detail-level 2

| Interface | Count0 (after 10) | Count1 | Delta (Count1 − Count0) |
|---|---|---|---|
| in block0.A | 1000 | 1400 | 400 |
| in block1.p1 | 1000 | 1400 | 400 |
| in block7.p1 | 1000 | 1400 | 400 |
| out block7.p2 | 1000 | 1400 | 400 |
| in block8.p1 | 1000 | 1400 | 400 |
| out block8.p3 | 3000 | 3400 | 400 |
| in block10.p2 | 3000 | 3400 | 400 |
| out block10.p3 | 4000 | 4400 | 400 |
| out block1.p3 | 4000 | 4400 | 400 |
| in block3.p1 | 4000 | 4400 | 400 |
| in block4.p1 | 4000 | 4400 | 400 |
| out block4.p2 | 4000 | 4400 | 400 |
| in block5.p1 | 4000 | 4400 | 400 |
| out block5.p2 | 4000 | 4300 | 300 |
| out block3.p2 | 4000 | 4300 | 300 |
| out block0.C | 4000 | 4300 | 300 |

Analyzing this output shows that 400 packets entered internal interface p1 of block 5 over the ten second interval but only 300 packets exited internal interface p2 of block 5. This would indicate that block 5 should be the subject of debugging procedures described more fully below.

It is not uncommon that there are multiple packet flows in the system that go over some common blocks. In the following the example of two concurrent flows in the system, one from A to C and another from B to C, are analyzed and the entries in bold indicate paths that are common to both flows.

The output of the path command for [detail-level <1>] for A to C is:

traceinternal A C path detail-level 1

```
in block0.A
    in block1.p1
        out block1.p3
        in block3.p1
        out block3.p2
out block0.C
```

The output of the path command for [detail-level <1>] for <B> to <C> is:

traceinternal B C path detail-level 1

```
in block0.B
    in block2.p2
    out block2.p1
    in block1.p2
        out block1.p3
        in block3.p1
        out block3.p2
out block0.C
```

The output of the path command for [detail-level <2>] for <A> to <C> is:

traceinternal A C path detail-level 2

```
in block0.A
    in block1.p1
        in block7.p1
        out block7.p2
        in block8.p1
        out block8.p3
        in block10.p2
        out block10.p3
    out block1.p3
    in block3.p1
        in block4.p1
        out block4.p2
        in block5.p1
        out block5.p2
    out block3.p2
out block0.C
```

The output of the path command for [detail-level <2>] for <B> to <C> is:

traceinternal B C path detail-level 2

```
in block0.B
    in block2.p2
    out block2.p1
    in block1.p2
        in block8.p2
        out block8.p3
        in block10.p2
        out block10.p3
    out block1.p3
    in block3.p1
        in block4.p1
        out block4.p2
        in block5.p1
        out block5.p2
    out block3.p2
out block0.C
```

The output of the counter at interval <10> command for [detail-level <2>] for <A> to <B> is:

traceinternal A C counters interval 10 detail-level 2

| Interface | Count0 | Count1 | Delta |
|---|---|---|---|
| in block0.A | 1000 | 1400 | 400 |
| in block1.p1 | 1000 | 1400 | 400 |
| in block7.p1 | 1000 | 1400 | 400 |
| out block7.p2 | 1000 | 1400 | 400 |
| in block8.p1 | 1000 | 1400 | 400 |
| out block8.p3 | 3000 | 6000 | 3000 |
| in block10.p2 | 3000 | 6000 | 3000 |
| out block10.p3 | 4000 | 5600 | 1600 |
| out block1.p3 | 4000 | 5600 | 1600 |
| in block3.p1 | 4000 | 5600 | 1600 |
| in block4.p1 | 4000 | 5600 | 1600 |
| out block4.p2 | 4000 | 5600 | 1600 |
| in block5.p1 | 4000 | 5600 | 1600 |
| out block5.p2 | 4000 | 5600 | 1600 |
| out block3.p2 | 4000 | 5600 | 1600 |
| out block0.C | 4000 | 5600 | 1600 |

The output of the counter at interval <10> command for detail-level <2> for <A> to <B> is:

traceinternal B C counters interval 10 detail-level 2

| | Count0 | Count1 | Delta |
|---|---|---|---|
| in block0.B | 5000 | 5700 | 700 |
| in block2.p2 | 5000 | 5700 | 700 |
| out block2.p1 | 5000 | 5700 | 700 |

-continued

|  | Count0 | Count1 | Delta |
|---|---|---|---|
| in block1.p2 | 5000 | 5700 | 700 |
| in block8.p2 | 5000 | 5700 | 700 |
| out block8.p3 | 3000 | 6000 | 3000 |
| in block10.p2 | 3000 | 6000 | 3000 |
| out block10.p3 | 4000 | 5600 | 1600 |
| out block1.p3 | 4000 | 5600 | 1600 |
| in block3.p1 | 4000 | 5600 | 1600 |
| in block4.p1 | 4000 | 5600 | 1600 |
| out block4.p2 | 4000 | 5600 | 1600 |
| in block5.p1 | 4000 | 5600 | 1600 |
| out block5.p2 | 4000 | 5600 | 1600 |
| out block3.p2 | 4000 | 5600 | 1600 |
| out block0.C | 4000 | 5600 | 1600 |

The counters of the internal interfaces, e.g. "out block1.p3", are influenced by all flows that go through them. If such a common counter does not get incremented, then it can be concluded that no flow is passing through it and that the block containing the counter has a problem. However, if such a counter is incremented, it cannot be concluded which particular flow or flows have passed through it. That case needs to be interpreted further.

In the above example, there are many common internal interfaces (shown in bold) between the two paths (A-to-C and B-to-C). During the interval there are 400 incoming packets in A and 700 incoming packets at B. So, for these two flows only, the outgoing packets at C should increase by 400+700=1100 however, a delta of 1600 occurs. The extra 500 (1600-1100) might have come from D via in.block10.p1. Also note that the delta at in.block10.p2 is 3000 but at the next point, out.block10.p3, it is 1600. The difference, 1400 (3000-1600), might have gone to D via out.block10.p1.

The information output by the different commands can be utilized as inputs to well known debugging techniques. For example, during the development phase of the network device some blocks or interfaces which are not required by a flow under investigation can be shut down. For a network device deployed in the field the traceinternal commands can be utilized to verify that all interfaces are incremented by at least the delta (1100 in the above example) of the first packet processing hardware logic block. Further, traceinternal can be run on some related paths (e.g. A-to-D, B-to-D, D-to-C as in the above example) and the numbers can be used to understand more about the specific situation.

Figure 4:
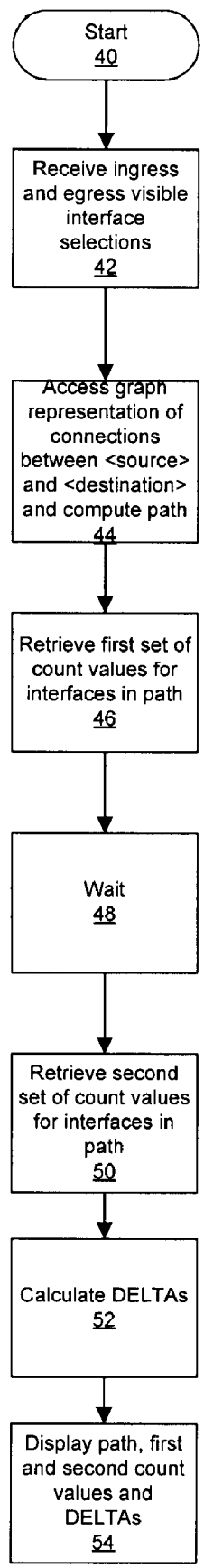
FIG. 4 illustrates an example algorithm.

An example algorithm executed by the CPU to generate the outputs depicted above will now be described with reference to the flow chart of FIG. 4. The algorithm begins at processing block 40. In processing block 42 the ingress and egress pair of user visible interfaces provided by the user in CLI command are received (in this example A and C). In processing block 44 a graph representation for internal connections between the user visible ingress interface to the user visible egress interface are accessed and the path from the user visible ingress interface to the user visible egress interface, through the internal blocks for the given detail-level, is computed as described more fully below. In processing block 46 a first set of count values is retrieved from counters monitoring packet flow at each of the internal interfaces traversed in the path between A and C for this network device. In processing block 48 the processing apparatus waits 10 seconds before, in processing block 50, a second set of count values is retrieved from counters monitoring packet flow at each of the internal interfaces traversed in the path between A and C for this network device. In processing block 52 the deltas between count values in the first and second sets are calculated and in processing block 52 the path, first and second count values and delta are displayed as described above.

In an example embodiment the traceinternal tool uses an appropriate adjacency list, as specified by the detail-level argument, to compute the path from the source, specified by <source>, to the destination, specified by <destination>. If the file containing the adjacency-list is not present, or the file does not contain the adjacency-list of the required detail-level, then the traceinternal tool cannot find the path.

An undirected graph G is a pair (V, E) where V is a finite set and E is a binary relation on V. The set V is called the vertex set of G, ant its elements are called vertices (singular: vertex). The set E is called the edge set of G, and its elements are called edges. The set E consists of unordered pairs of vertices. That is, an edge is a set $\{u, v\}$, where u, v $\in$ V, and u$\neq$v.

In this example embodiment, the adjacency-list representation of graphs are utilized which are disclosed on the en.wikipedia.org website with the extension /wiki/Adjacency_list. Adjacency-list representation of graphs are also described at Figure 23.1 in the book entitled "Algorithms" by Thomas H. Cormen, Charles E. Leiserseon, Ronald L. Rivest, Prentice Hall (1990).

FIGS. 5A-C depict a graph and its corresponding adjacency-list representations. The path from one given point to another given point can be found by applying some standard graph search algorithm (e.g. Depth First Search) on the graph.

In this example, the packet processing hardware logic block interconnection of the network device is modeled as a graph where the ports, both external and internal, are vertices, the connection between ports are edges at a given detail-level, and all the ports of any given block are fully connected to each other. The connectivity inside the device is modeled as a tree, i.e. there is only one way to reach from one vertex to another.

FIGS. 6A and 6B depict adjacency-lists for traceinternal interconnections of detail-level 0 and detail-level 1 respectively. In FIGS. 6A and 6B the number before the symbol "." represents the block number and the expression after represents the internal interface number for that block. For example, "1.p3" means internal interface p3 of Block 1.

In this example embodiment there are separate adjacency-lists for each detail-level of the device stored in memory in suitable file format and the file is separate from the software running on the device. This allows the device vendor to strictly control how much detail of the internal block interconnections are allowed to be exposed by the traceinternal tool and also allows the field support personnel of the device vendor to carry a detailed file, and use it for the duration of time necessary to debug a field deployed device without permanently releasing the details. The file needs to be present and readable only when the traceinternal tool is run. Depending on the detail-level required by the traceinternal tool, the correct adjacency-list is retrieved by the operating software.

Figure 7:
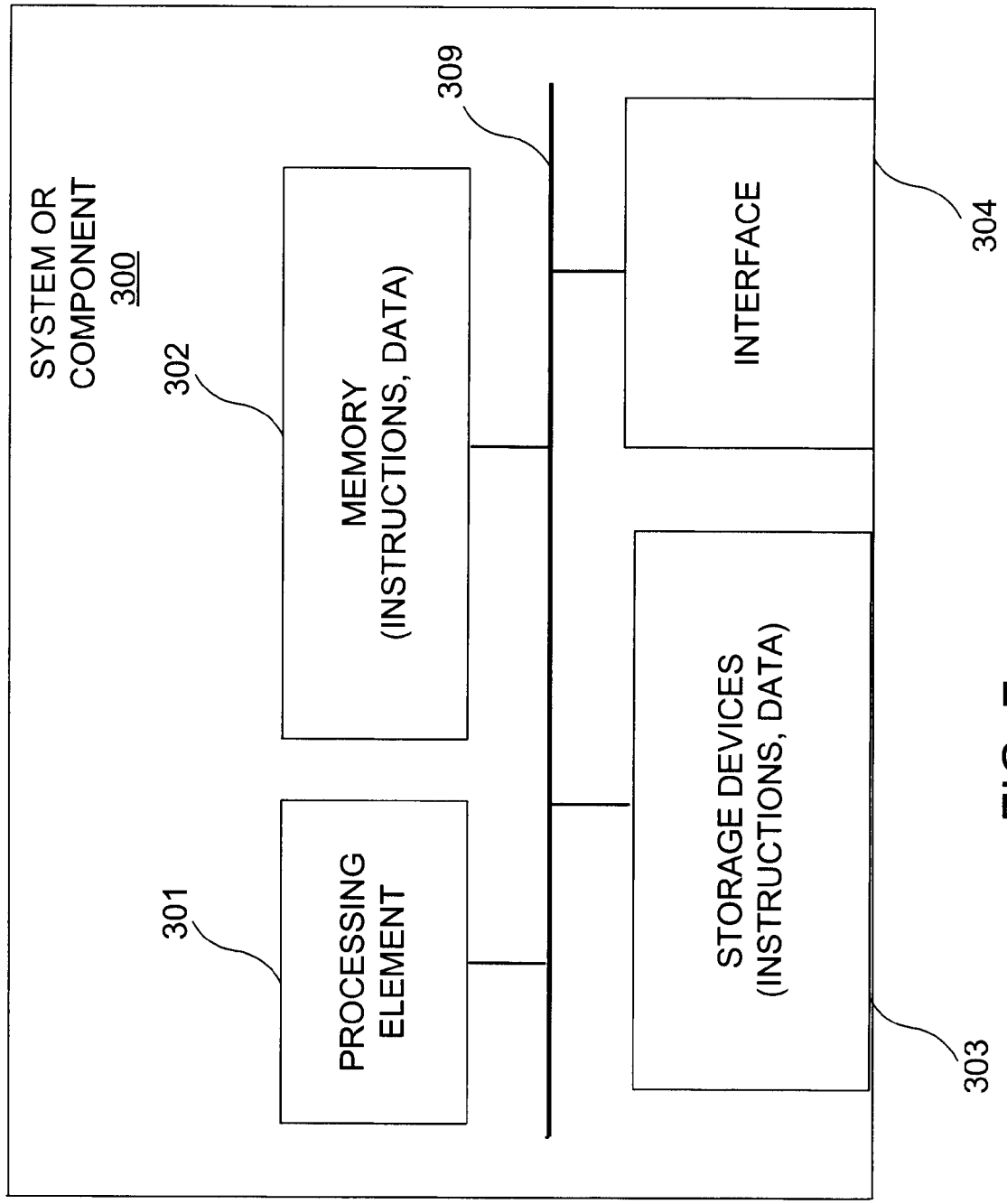
FIG. 7 illustrates an example processing apparatus.

FIG. 7 is a block diagram of an example processing apparatus 18 that can be utilized to execute program code to implement the example algorithm described with reference to FIG. 4. In one embodiment, processing apparatus 18 performs one or more processes corresponding to one or more of the flow diagrams illustrated or otherwise described herein.

In one embodiment, processing apparatus 18 includes a processing element 301, memory 302, storage devices 303 and interface 304 for receiving counter update requests and for communicating stored counter values with other entities and for sending and receiving information/data items and/or communicating with external devices (e.g. processors, packet processors, computers, etc.), which are typically coupled via one or more communications mechanisms 309, with the communications paths typically tailored to meet the needs of the application. Various embodiments of counter update mechanism 300 may include more or less elements. The operation of counter update mechanism 300 is typically controlled by processing element 301 using memory 302 and storage devices 303 to perform one or more tasks or processes. Memory 302 is one type of computer-readable medium, and typically comprises random access memory (RAM), read only memory (ROM), flash memory, integrated circuits, and/or other memory components. Memory 302 typically stores computer-executable instructions to be executed by processing element 301 and/or data which is manipulated by processing element 301 for implementing functionality in accordance with an embodiment. Storage devices 303 are another type of computer-readable medium, and typically comprise solid state storage media, disk drives, diskettes, networked services, tape drives, and other storage devices. Storage devices 303 typically store computer-executable instructions to be executed by processing element 301 and/or data which is manipulated by processing element 301 for implementing functionality in accordance with an embodiment.

The invention has now been described with reference to the example embodiments. Alternatives and substitutions will now be apparent to persons of skill in the art. Accordingly, it is not intended to limit the invention except as provided by the appended claims.

What is claimed is:

1. An apparatus comprising:
a plurality of packet processing hardware logic blocks included in a network device, with each packet processing hardware logic block including internal interfaces coupled to internal interfaces of another hardware logic block or to a user visible interface of the network device, with the network device configured so that packets ingressing at a first user visible interface and egressing from a second user visible interface always traverse a particular path of internal user interfaces and packet processing hardware logic blocks;
a memory storing a plurality of count values, each count value indicating a total number of packets that have traversed an associated internal interface, storing path data indicating the internal interfaces and packet processing hardware logic blocks traversed by packets ingressing at a user-selected first user visible interface and egressing from a user-selected second user visible interface of the network device and storing computer executable program code; and
a processing apparatus, coupled to the memory, configured to execute program code to receive identities of user-selected first and second user visible interface, to access first stored path data identifying the particular internal interfaces and packet processing hardware logic blocks that form a first path traversed by packets ingressing at the user-selected first user visible interface and egressing from the user-selected second user visible interface, to access a first set of count values associated with internal interfaces of the packet processing hardware logic blocks included in the first path, to wait a selected time interval, to access a second set of count values associated with the user visible interfaces in the first data when the time interval expires, and to display the count values in the first and second sets for each internal interface of the packet processing hardware logic blocks included in the first path.

2. The apparatus of claim 1 with processing apparatus further configured to:
compute a delta value for each internal interface of the first path, with the delta value equal to the difference between the count value in the first set of count values and the count value in the second set of count values associated with an interface; and
to display the count values in the first and second sets and delta value for each internal interface of a packet processing hardware logic block included in the path.

3. The apparatus of claim 1 where:
a first packet processing hardware logic block is partitioned into sub-logic blocks;
the memory further includes path data indicating internal interfaces and sub-blocks traversed by packets ingressing at a user-selected first user visible interface and egressing from a user-selected second user visible interface of the network device.

4. The apparatus of claim 3 where the processing apparatus is further configured to:
display a hierarchy of the packet processing hardware logic blocks and sub-blocks traversed by packets ingressing at a user-selected first user visible interface and egressing from a user-selected second user visible interface of the network device.

5. The apparatus of claim 1:
where the path data is stored as an adjacency-list graph representation.

6. The apparatus of claim 1 where:
path data is stored external to the memory.

7. The apparatus of claim 1 where:
the first user visible interface is a source Ethernet Virtual Connection per User Network Interface and the second user visible interface is a destination Ethernet Virtual Connection per User Network Interface.

8. A method comprising:
receiving identities of first and second user-selected user visible interfaces;
accessing path data representing a first path traversed from the first user-selected user visible interface to the second user-selected user visible interfaces through a plurality of packet processing hardware logic blocks included in a network device, with each packet processing hardware logic block including internal interfaces coupled to internal interfaces of another hardware logic block or to a user visible interface of the network device, with the network device configured so that packets ingressing at the first user-selected user visible interface and egressing from a second user-selected user visible interface always traverse a particular path of internal user interfaces and packet processing hardware logic blocks;
accessing a first set of count values associated with internal interfaces of the packet processing hardware logic blocks included in the first path;
waiting a selected time interval;
accessing a second set of count values associated with the user visible interfaces in the first data when the time interval expires; and
displaying the count values in the first and second sets for each internal interface of the packet processing hardware logic blocks included in the first path.

9. The method of claim 8 further comprising:
computing a delta value for each internal interface of the first path, with the delta value equal to the difference between the count value in the first set of count values and the count value in the second set of count values associated with an interface; and
displaying the count values in the first and second sets and delta value for each internal interface of a packet processing hardware logic block included in the path.

10. The method of claim 8 where:
a first packet processing hardware logic block is partitioned into sub-logic blocks;
path data indicates internal interfaces and sub-blocks traversed by packets ingressing at a user-selected first user visible interface and egressing from a user-selected second user visible interface of the network device.

11. The method of claim 8 where:
where the path data is stored as an adjacency-list graph representation.

12. The method of claim 8 where accessing path data further comprises:
accessing path data from system memory of the network device.

13. The method of claim 8 where accessing path data further comprises:
accessing path data from memory external to the network device.

14. The apparatus of claim 8 where:
the first user visible interface is a source Ethernet Virtual Connection per User Network Interface and the second user visible interface is a destination Ethernet Virtual Connection per User Network Interface.

15. One or more non-transitory computer readable storage media with an executable program stored thereon, wherein the program instructs a processor to perform the following steps:
receiving identities of first and second user-selected user visible interfaces;
accessing a path data representing a first path traversed from the first user-selected user visible interface to the second user-selected user visible interfaces through a plurality of packet processing hardware logic blocks included in a network device, with each packet processing hardware logic block including internal interfaces coupled to internal interfaces of another hardware logic block or to a user visible interface of the network device, with the network device configured so that packets ingressing at the first user-selected user visible interface and egressing from a second user-selected user visible interface always traverse a particular path of internal user interfaces and packet processing hardware logic blocks;
accessing a first set of count values associated with internal interfaces of the packet processing hardware logic blocks included in the first path;
waiting a selected time interval;
accessing a second set of count values associated with the user visible interfaces in the first data when the time interval expires; and
displaying display the count values in the first and second sets for each internal interface of the packet processing hardware logic blocks included in the first path.

16. The one or more not-transitory computer readable storage media of claim 15 wherein the program further instructs the processor to perform the following steps:
computing a delta value for each internal interface of the first path, with the delta value equal to the difference between the count value in the first set of count values and the count value in the second set of count values associated with an interface; and
displaying the count values in the first and second sets and delta value for each internal interface of a packet processing hardware logic block included in the path.

17. The one or more not-transitory computer readable storage media of claim 15 wherein the program further instructs the processor to perform the following steps:
accessing path data is stored as an adjacency-list graph representation.

18. The one or more not-transitory computer readable storage media of claim 15 wherein the program further instructs the processor to perform the following steps:
accessing path data from system memory of the network device.

19. The one or more not-transitory computer readable storage media of claim 15 wherein the program further instructs the processor to perform the following steps:
accessing path data from memory external to the network device.

* * * * *